Patented Sept. 8, 1936

2,053,768

UNITED STATES PATENT OFFICE 2,053,768

MANUFACTURE OF CELLULOSE DERIVATIVES

Henry Dreyfus, London, England

No Drawing. Original application October 30, 1930, Serial No. 492,363. Divided and this application October 31, 1933, Serial No. 696,028. In Great Britain November 28, 1929

19 Claims. (Cl. 260—101)

This invention relates to the manufacture of halogen-containing cellulose derivatives from cellulose esters or ethers containing hydroxy groups, present for example in the form of alcoholic groups or carboxylic acid groups, and is a divisional application from my U. S. application S. No. 492,363 filed 30th October, 1930.

In my U. S. Patent No. 1,502,379 and my U. S. application S. No. 162,214 filed 19th January, 1927, I have described the production of cellulose ethers by introducing into the cellulose molecule one or more residues of glycols or other polyhydric alcohols, and in my U. S. application S. No. 348,980 filed 21st March, 1929 and my British specification No. 320,842 the production of cellulose esters of hydroxy aliphatic acids, for example glycollic acid. Again, in my U. S. application S. No. 492,085 filed 29th October, 1930 processes are described for the production of the higher carboxyalkylated derivatives of cellulose.

I have now found that halogenated cellulose esters or ethers may be obtained by halogenation of cellulose derivatives containing hydroxy groups. Halogenation of the cellulose esters or ethers may be effected by any method suitable for the halogenation of alcoholic groups or for the conversion of carboxylic acids into acid halides. Preferably the method employed is one which does not result in substantial degradation of the cellulose derivative. A method which is particularly valuable in that it may be employed at ordinary temperatures or at temperatures only slightly above atmospheric temperature is a simple treatment of the hydroxy-containing cellulose derivative with thionyl chloride.

The cellulose ester or ether, for example cellulose glycollate, hydroxy-ethyl cellulose, or cellulose glycollic acid (carboxymethyl cellulose), may be treated with the tionyl chloride directly or in presence of a solvent for the cellulose ester or ether or in presence of a non-solvent diluent. The action may if desired be accelerated by heating, but preferably the temperature is not allowed to exceed about 50 to 60° C.

The products of the present invention may be utilized for the production of films or plastic materials or for the manufacture of artificial filaments or threads or for other purposes to which cellulose acetate or other cellulose derivatives have in the past been applied. By effecting the reactions in presence of non-solvents and by starting with cellulose derivatives having the fibrous structure of cellulose, halogenated derivatives having a fibrous structure may be produced. This is of advantage in the treatment of fabrics and also yarns which may be used for effect purposes in association with cotton or the cellulosic type of artificial silk or with cellulose acetate or other cellulose esters having little or no affinity for acid dyestuffs.

New nitrogen-containing cellulose derivatives may be produced by treating with ammonia or organic amines, as described in the parent application S. No. 492,363, the halogen-containing derivatives of the present invention, and these may be utilized for the preparation of films or plastic materials, or for the manufacture of artificial filaments or threads, or for other purposes to which cellulose acetate or cellulose derivatives have in the past been applied.

The following examples illustrate the invention, but are not to be considered as limiting it in any way:—

Example 1

Cellulose glycollic acid, for example that obtained according to my U. S. Patent No. 1,884,629, is dissolved or suspended in about 10 times its weight of benzene and treated with about 1¼ times its own weight of thionyl chloride in the case of an ether containing 2½–3 ether groups or a correspondingly smaller quantity with a lower ether. The mixture is at first gently warmed and is maintained at a temperature of 25–35° C. After 20–30 minutes the excess of thionyl chloride and the benzene are removed under vacuum and the cellulose derivative washed cautiously with ligroin.

Example 2

Hydroxyethyl cellulose or other hydroxyalkylated cellulose, obtained for example by the processes described in my U. S. Patent No. 1,502,379 and my U. S. application S. No. 162,214 filed 19th January, 1927, is treated with thionyl chloride as described in Example 1.

Example 3

A carboxy ester of cellulose, e. g. cellulose malonate, cellulose phthalate, cellulose malate or cellulose maleate, obtained for instance by the action of the corresponding acid on cellulose in presence of chloracetic anhydride, is treated with thionyl chloride as described in Example 1.

What I claim and desire to secure by Letters Patent is:—

1. Process for the manufacture of chlorine-containing cellulose derivatives, comprising treating a substitution derivative of cellulose containing a hydroxy radicle in a substituent group with thionyl chloride.

2. Process for the manufacture of chlorine-containing cellulose derivatives, comprising treating an ether of cellulose containing a free carboxy group in a substituent group with thionyl chloride.

3. Process for the manufacture of chlorine-containing cellulose derivatives, comprising treating an ester of cellulose containing a free carboxy group in a substituent group with thionyl chloride.

4. Process for the manufacture of chlorine-containing cellulose derivatives, comprising treating an ether of cellulose containing an alcoholic hydroxy group in a substituent group with thionyl chloride.

5. Derivatives of cellulose containing the group —CO.X, where X is a halogen atom.

6. Acid halides of carboxy ethers of cellulose.

7. Acid halides of carboxy esters of cellulose.

8. Acid chlorides of carboxy ethers of cellulose.

9. Acid chlorides of carboxy esters of cellulose.

10. Cellulose ethers containing the grouping —R.X, where R is an alkyl radicle and X is a halogen atom.

11. Cellulose ethers containing the grouping —R.X, where R is an alkyl radicle and X is a chlorine atom.

12. Process for the manufacture of halogen-containing cellulose derivatives, comprising replacing with a halogen atom, by reaction with a halogenating agent, a hydroxyl group contained in a substituent group of a cellulose derivative.

13. Process for the manufacture of chlorine-containing cellulose derivatives, comprising replacing with a chlorine atom, by reaction with a chlorinating agent, a hydroxyl group contained in a substituent group of a cellulose derivative.

14. Process for the manufacture of chlorine-containing cellulose derivatives, comprising replacing with a chlorine atom, by reaction with a chlorinating agent, a carboxylic hydroxyl group contained in a substituent group of a cellulose derivative.

15. Process for the manufacture of chlorine-containing cellulose derivatives, comprising replacing with a chlorine atom, by reaction with a chlorinating agent, an alcoholic hydroxyl group contained in a substituent group of a cellulose derivative.

16. Process for the manufacture of halogen-containing cellulose derivatives, comprising reacting a substitution derivative of cellulose, containing a hydroxyl group in a substituent group, with a halogen-containing compound which is capable of replacing hydroxyl by halogen.

17. Process for the manufacture of chlorine-containing cellulose derivatives, comprising reacting a substitution derivative of cellulose, containing a hydroxyl group in a substituent group, with a chlorine-containing compound which is capable of replacing hydroxyl by chlorine.

18. Process for the manufacture of chlorine-containing cellulose derivatives, comprising reacting a substitution derivative of cellulose, containing a carboxylic hydroxyl group in a substituent group, with a chlorine-containing compound which is capable of replacing hydroxyl by chlorine.

19. Process for the manufacture of chlorine-containing cellulose derivatives, comprising reacting a substitution derivative of cellulose, containing an alcoholic hydroxyl group in a substituent group, with a chlorine-containing compound which is capable of replacing hydroxyl by chlorine.

HENRY DREYFUS.